Oct. 2, 1928.                                    1,686,121
                     B. G. BRENNAN
    MACHINE FOR TRANSFERRING AND CHOPPING ANIMAL CARCASSES
                Filed Oct. 26, 1925         2 Sheets-Sheet 1
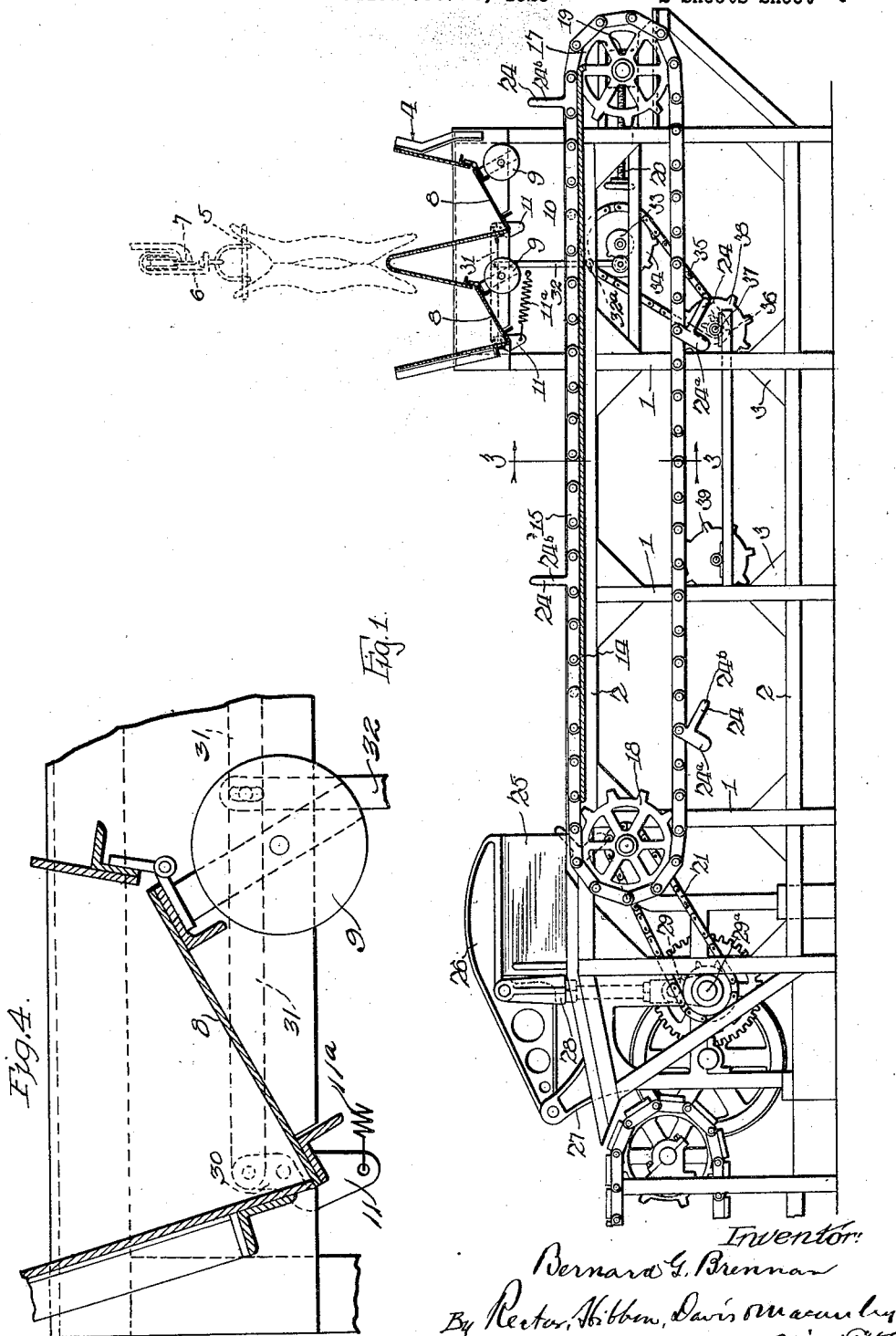

Oct. 2, 1928.　　　　　　　　　　　　　　　　1,686,121
B. G. BRENNAN
MACHINE FOR TRANSFERRING AND CHOPPING ANIMAL CARCASSES
Filed Oct. 26, 1925　　　2 Sheets-Sheet 2
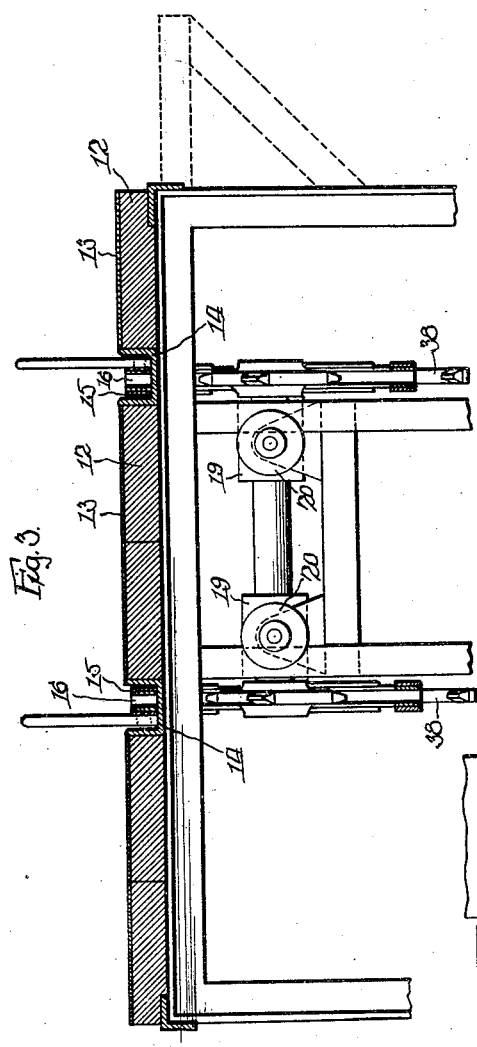
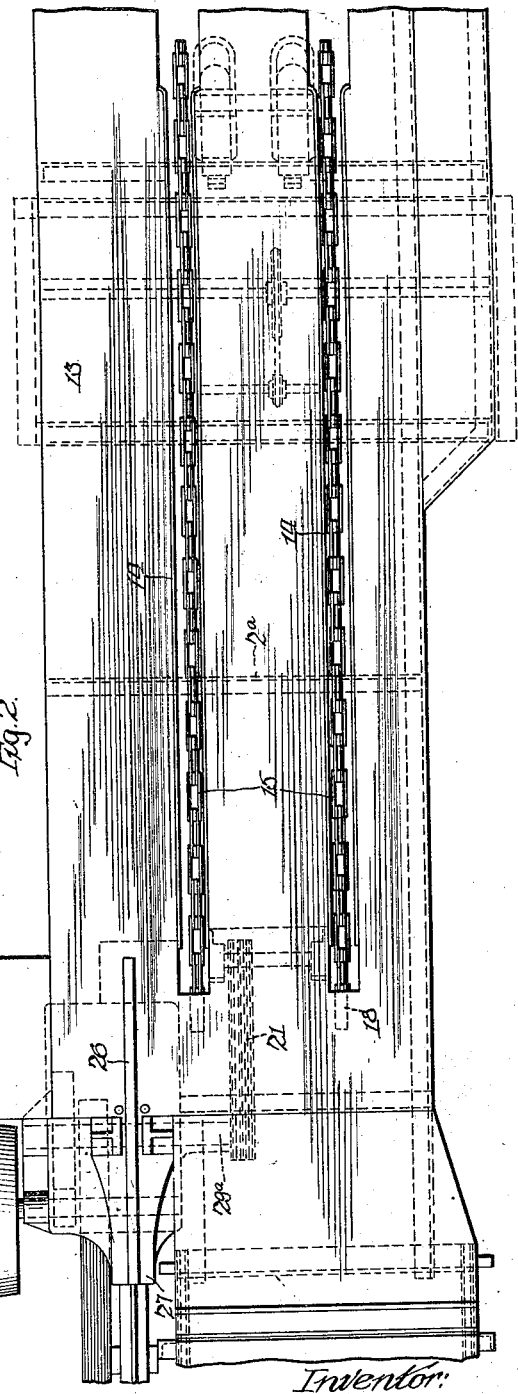
Inventor:
Bernard G. Brennan
By Rector, Hibben, Davis & Macauley
His Attys.

Patented Oct. 2, 1928.

1,686,121

UNITED STATES PATENT OFFICE.

BERNARD G. BRENNAN, OF CHICAGO, ILLINOIS.

MACHINE FOR TRANSFERRING AND CHOPPING ANIMAL CARCASSES.

Application filed October 26, 1925. Serial No. 64,728.

In the meat packing industry it is the practice to continuously convey the carcasses of butchered animals in a line from one department or operating stage to another, a given operation being performed at one point, another at the next, and so on. My present invention relates to apparatus or machinery arranged to receive at one point the headless, split carcasses of hogs or other animals suspended from gambrels, and from such point transfer the split sides and deliver them in timed succession to a chopping machine arranged to operate in synchronism with the transfer and delivery means and chop the shoulders from the sides, the sides being then ready for further cutting operations at a further point in the packing plant. The object of my invention is the provision of an efficient machine by which the steps mentioned may be expeditiously and economically performed, and to this end I have designed and invented the novel carcass feeding and cutting machine which is hereinafter described and which is illustrated in the accompanying drawings. My invention resides in the new combination and organization of the different parts making up the machine, and in certain details of construction which I have devised for accomplishing the ends in view, the essential elements of my invention being more particularly pointed out in the appended claims. I do not, however, intend to limit my claims to the precise construction described, but intend to include within the scope of the claims all variations of form and all modifications in construction which may be made by the substitution of equivalent elements for those specifically mentioned, and which come within the true spirit and scope of my invention.

In the accompanying drawings I have illustrated my invention in the best form now known to me, Figure 1 being a side view of the machine; Fig. 2 a plan view of the same; Fig. 3 a transverse vertical section on the line 3—3 of Fig. 1; and Fig. 4 a fragmentary view of a latch mechanism used upon the hoppers of the machine.

Like reference characters indicate like parts in all the figures of the drawing.

The frame work of the machine, as illustrated, includes uprights 1, connected by horizontal longitudinal frame members 2 and cross-members 2ª, braced by angle plates 3, and provided with rigidly connected braces and bracket members to form a strong substantial frame arranged to support the movable parts, though the particular design and arrangements of the frame members is immaterial so long as they provide for adequate support and proper disposition of the parts essential to my invention.

The split carcasses to be received and delivered to the chopping knife, almost entirely severed and connected only by a slight strip of skin and meat, are brought up to the double hopper 4 of the machine upon gambrels 5 suspended from carriages 6 provided with a trolley wheel mounted to run upon an overhead conveyor track 7. Ordinarily the carcasses are conveyed along the track by an automatic conveyor mechanism which is old in the art and need not here be described. As the carcasses come, one by one, to a position immediately over the hopper, they reach workmen who entirely sever the sides and cut one of the gambrel attachments, permitting the sides of the carcass to fall, one in each of the two compartments, the workman directing the shoulders towards what will be termed the right side of the machine, the hopper being regarded as at the front end and the chopping knife at the rear end. Obviously the double hopper may be formed structurally as two distinct hoppers, adjacent each other, if desired.

The bottom of each compartment of the hopper consists of a hinged trap door 8, which is provided with a counterweight 9 arranged to close it after a side has been delivered to the table 10 underneath. The hoppers are each equipped with a pair of pivoted latches 11 tensioned by springs 11ª and arranged to automatically relatch the door in closed position as soon as it has been returned by the counterweight, these latches being arranged to be simultaneously disengaged at regular intervals by means hereinafter described.

The table 10 of the machine may conveniently be constructed of longitudinally arranged wooden planks 12 secured to the top frame members and covered with a sheet metal covering 13, as shown, though it may be constructed entirely of metal if desired. Sunk into the table top and forming a part thereof are two U-shaped metal runways 14—14 adapted to receive a pair of sprocket chains, consisting of pairs of links 15—15 pivoted together on opposite sides of rollers 16 which in their upper traverse ride upon the bottom of the U-shaped tracks. At their end loops the sprocket chains engage pairs of sprocket wheels 17 and 18, rotatably mounted in the frame of the machine, the front sprocket wheels 17 being mounted in longitudinally adjustable bearing blocks 19 which are arranged to be adjusted by means of screws 20 for the purpose of taking up wear or stretch in the chain elements. It will be noted that rearwardly of the track members 14—14 the table is cut away to provide for passage of the sprocket chains downwardly therethrough, and the front end of the table is also cut away to likewise provide clearance for the chains.

The rear sprocket wheels 18 are positively driven through a sprocket chain 21 and cooperating sprocket wheel 22 secured to the shaft 23 upon which the sprocket wheels 18 are rigidly fixed, by means of operating connections later to be described.

The sprocket chains are provided at intervals with pairs of opposite pusher bars 24 which are approximately L-shaped in form, each bar having a base portion $24^a$ extending forwardly from a point at which it is pivoted to one of the pivots connecting the links 15 and a pusher bar or post portion $24^b$ extending at right angles to the face of the table, the directions stated being those occupied by the bars when passing from front to rear on top of the table. The base portions of the bars will obviously hold the bars upright during their rearward traverse over the table, while the weight of the base (which is sufficiently heavy for the purpose) will tip the pusher posts downwardly and towards the front end of the table as soon as the base has cleared the track. When the bars have completed the lower part of their return travel and reach the front end of the track members, the latter will react upon the base portions of the bars to restore them to the position first described. The chains and pusher bars, it will be noted, are spaced well inwardly from the margins of the table, in such position as to push a carcass side in front of each pair of pushers over the surface of the table from beneath the hopper to a point on the table underneath the chopping knife, the carcass side coming to rest at this point as the base portions of the pushers clear the tracks and the posts drop downwardly and pass with the chains through the table around the rear sprocket wheels.

The chopping blade 25 is secured in an oscillating knife frame 26 which is pivoted at its rear to a bracket 27 secured to the machine frame. The knife frame is oscillated by a pitman 28 connected to a crank 29 on a driven shaft $29^a$ journaled in the machine frame, and the rear sprocket wheels 18 are in the present instance also driven from this shaft $29^a$ by means of a sprocket wheel upon such shaft engaging the sprocket chain 21 before mentioned.

The latches 11 above mentioned are arranged to be simultaneously and intermittently operated to release the trap doors of the hopper and permit the carcass sides to drop upon the table at instants when every alternate pair of pusher posts are passing beneath the hopper and are midway between the two compartments thereof. To effect this rocking of the latches the two latches at each end of the hopper casing (at the side of the machine) are formed with upwardly extending portions constituting arms 30 which are pivotally connected by a link 31 adapted to be actuated to rock both arms and latches by means of a lever 32 loosely pivoted at its upper end to the link and intermittently pivoted at $32^a$ to the machine frame on the particular side, the levers at the two sides of the machine being rocked in unison by a pair of rotating cams 33 cooperating with cam rollers on the lower ends of the two levers. The cams are caused to rotate so as to operate the latches through the connection just described and thereby release the trap doors, by means of a sprocket wheel 34 secured to the same shaft that carries the cams, a sprocket chain 35, a sprocket wheel 36 fast on a crossshaft 37 to which is secured a pair of sprocket wheels 38, the last mentioned sprocket wheels being arranged to engage the rollers 16 of the conveyor sprocket chains before described. The sprocket wheels 38 serve also to prevent the conveyor chain from sagging, and a similar pair of idler sprocket wheels 39, also engaging the lower reach of the belt, are provided for the same purpose.

From the foregoing description it will be readily understood that when the trap doors are released and a pair of carcass sides are deposited on opposite sides of the pair of push bars at the time centrally underneath the hoppers, the push bars will immediately carry the rearmost carcass side rearwardly while the front side will rest upon the table until the succeeding pair of push bars engage it and push it in turn rearwardly towards the chopping knife. The trap doors, as soon as relieved of the weight of the carcass sides, will immediately be returned by the counterweights 9 to closed position, camming the latches 11 aside against the tension of the springs $11^a$ so as to automatically restore latched engagement of the doors, the links 31 and levers 32 shifting idly during such latching movement. As the next pair of pushers reach a position midway under the hopper the trap doors are again released to deliver another pair of carcass sides on opposite sides of the pusher posts, and so on. Ordinarily a couple of workmen stationed at opposite sides of the table near the knife adjust the sides as they successively come to rest under or nearly under the knife to the exact position required to make the proper cut, and after the shoulder has been severed the workman at the right side of the table removes the shoulder while the workman opposite removes the side.

The machine of my present invention is particularly adapted to be used in connection with a cutting table at which workmen perform different further operations on the sides, either a stationary table, or a movable conveyor table such as described in my pending application for Patent No. 64,729, filed October 26, 1925. To facilitate the delivery of the sides to such cutting table the front end of the table of the machine of my present invention is slightly inclined and arranged to overhang the front end of the cutting table, so that the workman at the left side of the table may readily pass on the sides to the cutting table.

I claim:

1. Means for delivering split animal carcasses at timed intervals to a fixed working point including means for supplying the split carcasses, a double hopper arranged to receive and discharge the carcass sides, and conveyor means underneath said hopper arranged to transfer said sides separately at regular intervals to said working point.

2. In meat-handling apparatus including means for supplying split animal carcasses, a double hopper arranged to receive and simultaneously discharge the carcass sides, and conveyor means underneath said hopper arranged to transfer said sides and release them separately at regular intervals at a fixed working point.

3. In meat-handling apparatus including means for supplying split carcasses, a double hopper arranged to receive and discharge the carcass sides, a stationary table below said hopper, conveyor mechanism including pusher members projecting above said table arranged to transfer said sides on said table and release them separately at regular intervals at a fixed working point.

4. In meat-handling apparatus including means for supplying split carcasses, a two-compartment hopper having a pair of trap doors arranged to close the bottoms of the two compartments, latching means arranged to hold said trap doors closed, conveyor means including pusher members arranged to pass successively under said hoppers, and means for operating said latching means to release both trap doors simultaneously.

5. In meat-handling apparatus including means for supplying split carcasses, a two-compartment hopper having a pair of trap doors arranged to close the bottoms of the two compartments, latching means arranged to hold said trap doors closed, conveyor means including pusher members arranged to pass successively under said hoppers, and means for automatically operating said latching means to release both trap doors simultaneously when a pusher member is in an intermediate position underneath the hopper.

6. In meat-handling apparatus including means for supplying split carcasses, a two-compartment hopper arranged to receive the pair of carcass sides and having a pair of trap doors arranged to close the bottoms of the two compartments, latching means arranged to hold said hopper doors closed, said trap doors being arranged to open under the weight of a carcass side when unlatched and when relieved return to latched position, a stationary table below said hopper, a conveyor including pusher members arranged to pass at regular intervals beneath said hoppers and transfer carcass sides on said table, and means for automatically releasing said latches.

7. In meat-handling apparatus including means for supplying split carcasses, a two-compartment hopper having a pair of trap doors arranged to close the bottoms of the two compartments, latching means arranged to hold said trap doors closed, conveyor means including pusher members arranged to pass successively under said hoppers, and means for releasing both latches simultaneously at the passage of every alternate pusher underneath the hopper.

8. In meat-handling apparatus including means for supplying split carcasses, a two-compartment hopper having a pair of trap doors arranged to close the bottoms of the two compartments, latching means arranged to hold said trap doors closed, a stationary table below said hopper, a conveyor including pusher members arranged to pass at regular intervals beneath said hoppers and transfer carcass sides on said table, and automatic means for operating said latching means to release both trap doors simultaneously at the passage of every alternate pusher underneath the hopper.

9. Means for delivering split animal carcasses at timed intervals to a fixed working point including an overhead conveyor arranged to supply the split carcasses, a hopper arranged to receive the carcass sides and having means for discharging the sides at regular intervals, and a conveyor below said hopper arranged to receive sides discharged from the conveyor and transfer them separately at regular intervals to said working point.

10. In meat-handling apparatus including means for supplying meat carcasses, a two-compartment hopper having a pair of trap doors arranged to close the bottoms of the two compartments, separate latches arranged to hold said trap doors closed, and a common releasing mechanism connected to both latches for simultaneously releasing them.

11. A mechanical structure according to claim 10 in which said releasing mechanism includes a link pivoted to both latches and a vibrating lever connected to said link and also operatively connected to said conveyor.

12. In apparatus of the character described, a stationary table having a pair of channels in its upper face, sprocket wheels and a pair of endless sprocket chains engaging such wheels and running in said channels on their upper reach and disposed with their end loops and lower reaches beneath said table, L-shaped pusher bars pivoted adjacent their angles to said chains and having base portions extending from the angle at their leading end and running in said channels, and having pushing portions standing rising vertically from said base portions while such base portions are running in said channels, said channels terminating and said table being cut away opposite the sprocket wheel toward which the pusher bars run, whereby the pushing portions thereof may rock in the opposite direction when the base portions clear the channels.

BERNARD G. BRENNAN.